US010015620B2

(12) United States Patent
Dillen et al.

(10) Patent No.: US 10,015,620 B2
(45) Date of Patent: Jul. 3, 2018

(54) HEAD TRACKING

(75) Inventors: Paulus Henricus Antonius Dillen, Eindhoven (NL); Arnoldus Werner Johannes Oomen, Eindhoven (NL); Erik Gosuinus Petrus Schuijers, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 455 days.

(21) Appl. No.: 13/147,954

(22) PCT Filed: Feb. 9, 2010

(86) PCT No.: PCT/IB2010/050571
§ 371 (c)(1),
(2), (4) Date: Aug. 4, 2011

(87) PCT Pub. No.: WO2010/092524
PCT Pub. Date: Aug. 19, 2010

(65) Prior Publication Data
US 2011/0293129 A1 Dec. 1, 2011

(30) Foreign Application Priority Data
Feb. 13, 2009 (EP) .................................... 09152769

(51) Int. Cl.
*G06F 15/00* (2006.01)
*G01P 3/00* (2006.01)
(Continued)

(52) U.S. Cl.
CPC .................................... *H04S 7/304* (2013.01)

(58) Field of Classification Search
CPC ....................................................... G06F 3/012
(Continued)

(56) References Cited

U.S. PATENT DOCUMENTS 5,742,264 A * 4/1998 Inagaki ................ G02B 27/017 345/7
5,905,464 A * 5/1999 Lanciaux ...................... 342/443
(Continued)

FOREIGN PATENT DOCUMENTS

DE 2716345 A1 10/1978
DE 10148006 A1 6/2003
(Continued)

OTHER PUBLICATIONS

Minnaar et al: "The Importance of Head Movements for Binaural Room Synthesis"; Proceedings of the 2001 International Conference on Auditory Display, Espoo, Finland, Jul. 29-Aug. 1, 2001, pp. ICAD01-21-ICAD01-25.
(Continued)

*Primary Examiner* — Duc Nguyen
*Assistant Examiner* — Phan Le

(57) ABSTRACT

A head tracking system that determines a rotation angle of a head of a user with respect to a reference direction, dependent on a movement of a user including changes of place, position, and/or posture. The head tracking system includes a sensing device for measuring a head movement to provide a measure representing the head movement, and a processing circuit for deriving the rotation angle of the head of the user with respect to the reference direction from the measure. The reference direction is dependent on the movement of the user.

16 Claims, 4 Drawing Sheets

(51) Int. Cl.
*H04R 25/00* (2006.01)
*H04S 7/00* (2006.01)

(58) Field of Classification Search
USPC .......................................... 381/309, 310, 370
See application file for complete search history.

(56) References Cited

U.S. PATENT DOCUMENTS

| | | | | |
|---|---|---|---|---|
| 5,959,597 | A * | 9/1999 | Yamada ............... | G02B 27/017 345/7 |
| 6,786,877 | B2 * | 9/2004 | Foxlin ................... | A61B 5/1114 600/587 |
| 2005/0256675 | A1 * | 11/2005 | Kurata .......................... | 702/153 |
| 2006/0045294 | A1 * | 3/2006 | Smyth ........................... | 381/309 |
| 2007/0015611 | A1 * | 1/2007 | Noble ................... | A61B 5/1116 473/450 |
| 2008/0170730 | A1 * | 7/2008 | Azizi et al. ................... | 381/310 |
| 2008/0190201 | A1 * | 8/2008 | Makino ................ | A61B 5/1126 73/510 |
| 2009/0058606 | A1 * | 3/2009 | Munch .................. | G01S 13/758 340/10.1 |
| 2009/0097689 | A1 * | 4/2009 | Prest .................... | H04R 1/1091 381/380 |

FOREIGN PATENT DOCUMENTS

| | | |
|---|---|---|
| JP | 59044197 A | 3/1984 |
| JP | 07203597 | 8/1995 |
| JP | 090416797 | 2/1997 |

OTHER PUBLICATIONS

MacKensen: "Auditive Localization. Head Movements, and Additional Cue in Localization"; Dissertation, Geisteswisseneschaften der Technischen Universtat Berlin, Jan. 2004, 106 Page Document.

Knuth,M.: "Development of a Head Tracking Solution Based on Accelerometers for MPEG Surround"; Pahilips Applied Technologies University of Applied Sciences Dusseldorf and Philips Research Department of Media, Technical Note PR-TN 2007/00647, 82 Page Document.

Algazi et al: "Motion-Tracked Binaural Sound for Personanl Music Player"; Audio Engineering Society Convention Paper 6557, Oct. 2005, pp. 1-8.

Kindratenko, V.: "A Survey of Electromagnetic Position Tracker Calibration Techniques"; Virtual Reality, Virtual Press, vol. 5, No. 3, Jan. 2000, pp. 169-182.

* cited by examiner

HEAD TRACKING

FIELD OF THE INVENTION

The invention relates to a head tracking system. The invention also relates to a head tracking method. Furthermore, the invention relates to an audio reproduction system.

BACKGROUND OF THE INVENTION

Headphone reproduction of sound typically provides an experience that a sound is perceived 'inside the head'. Various virtualization algorithms have been developed which create an illusion of sound sources being located at a specific distance and in a specific direction. Typically, these algorithms have an objective to approximate a transfer function of the sound sources (e.g. in case of stereo audio, two loudspeakers in front of the user) to the human ears. Therefore, virtualization is also referred to as binaural sound reproduction.

However, merely applying a fixed virtualization is not sufficient for creating a realistic out-of-head illusion. A human directional perception appears to be very sensitive to head movements. If virtual sound sources move along with movements of the head, as in the case of fixed virtualization, the out-of-head experience degrades significantly. If the relation between a perceived sound field and a head position is different than expected for a fixed sound source arrangement, the sound source positioning illusion/perception strongly degrades.

A remedy to this problem is to apply head tracking as proposed e.g. in P. Minnaar, S. K. Olesen, F. Christensen, H. Moller, 'The importance of head movements for binaural room synthesis', Proceedings of the 2001 International Conference on Auditory Display, Espoo, Finland, Jul. 29-Aug. 1, 2001, where the head position is measured with sensors. The virtualization algorithm is then adapted according to the head position, so as to account for the changed transfer function from virtual sound source to the ears.

It is known for the out-of-head illusion that micro-movements of the head are most important as shown in P. Mackensen, 'Auditive Localization, Head movements, an additional cue in Localization', Von der Fakultat I—Geisteswissenschaften der Technischen Universitat Berlin. Yaw of the head is by far more important for the sound source localization than pitch and roll of the head. Yaw, often referred to as azimuth, is an orientation defined relative to the head's neutral position, and relates to the rotation of the head.

Today, a multitude of head tracking systems (mainly consumer headphones or gaming applications) are available which use e.g. ultrasonic technology (e.g. BeyerDynamic HeadZone PRO headphones), infrared technology (e.g. NaturalPoint TrackIR plus TrackClip), transmitters/receivers, gyroscopes (e.g. Sony MDR-IF8000/MFR-DS8000), or multiple sensors (e.g. Polhemus FASTRAK 6DOF). In general, these head tracking systems determine the head position relative to an environment, either by using a fixed reference with a stable (invariant) position relative to the environment (e.g. an infrared 'beacon, or using the earth magnetic field), or by using sensor technology that once calibrated, does not drift significantly during the listening session (e.g. by using high-accuracy gyroscopes).

However, the known head tracking systems cannot be easily used for mobile applications in which the user moves. For such applications obtaining a positional and orientation reference is generally difficult or impossible, since the environment is mostly a-priori unknown and out of user's control.

SUMMARY OF THE INVENTION

It is an object of the present invention to provide an enhanced head tracking system that can be used for a mobile user. The invention is defined by the independent claims. The dependent claims define advantageous embodiments.

A head tracking system proposed in the invention determines a rotation angle of a head of a user with respect to a reference direction, which is dependent on a movement of a user. Here the movement of a user should be understood as an act or process of moving including e.g. changes of place, position, or posture, such as lying down or sitting in a relaxation chair. The head tracking system according to the invention comprises a sensing device for measuring a head movement to provide a measure representing the head movement, and a processing circuit for deriving the rotation angle of the head of the user with respect to the reference direction from the measure. The reference direction used in the processing circuit is dependent on the movement of the user.

The advantage of making the reference direction dependent on a movement of a user is that determining the rotation angle of the head is independent of the environment, i.e. not fixed to environment. Hence whenever the user is e.g. on the move and his body parts undergo movement the reference direction is adapted to this movement. One could say informally that the reference direction moves along with the movement of the user. For example, when the user walks or runs and briefly looks to the left or right, the reference direction should not change. However, when the walking or running user takes a turn his body undergoes a change of position (to a tilt), which especially when long lasting, should cause a change of the reference direction. This property is especially important when the head tracking device is used together with an audio reproducing device comprising headphones for creating a realistic experience while maintaining an impression of out-of-head experience. The invention enables that virtual sound field orientation is not fixed to surroundings, but moves with the user. In various mobile scenarios in which a user uses binaural playback on e.g. portable media player or mobile phone, during his movement this is a very desirable property. The sound field virtualization is then adapted according to the head orientation, so as to account for the change in transfer function from virtual sound source to the ears. For mobile applications, absolute head orientation is less relevant, since the user is displacing anyway. Fixing a sound source image relative to earth is hence not desirable.

In an embodiment, the processing circuit is further configured to determine the reference direction as an average direction of the head of the user during the movement of the user. When the user performs small head movements while e.g. looking straight forward, these small head movements can be precisely measured with regard to the reference direction which is the straight forward direction. However, when rotating the head by e.g. 45 degrees to the left and maintaining the head in that position on average, it is important to measure the small head movements with regard to this new head position. Using an average direction of the head as the reference direction is therefore advantageous as it allows the head tracking to adapt to long-term head movements (e.g. looking sideways for a certain period of time longer than just a few seconds) and/or change of a path of user travel (e.g. taking a turn when biking). It is expected that when measured for a prolonged period of time, on average the direction of the head will typically correspond to the direction of a torso of the user. Another advantage in the mobile application is that head tracking sensors, particularly accelerometers, exhibit drift related to noise and non-linearity of the sensors. This in turn results in errors accumulated over time, and leads to an annoying stationary position bias of the virtual sound sources. This problem is however overcome when using this invention, because the proposed head tracking is highly insensitive to such cumulative errors.

In a further embodiment, the sensing device comprises at least an accelerometer for deriving an angular speed of a rotation of the head of the user as the measure based on centrifugal force caused by the rotation. The accelerometer can be placed on the top of the head, or when two accelerometers are used on the opposite sides of the head, preferably close to the ears. Accelerometers are nowadays a cost-effective commodity in consumer applications. Also, they have lower power consumption compared to other alternatives such as e.g. gyroscope sensors.

In a further embodiment, the processing circuit is configured to derive an average direction of the head of the user from the angular speed of the head of the user. The average direction of the head is obtained by integrating the angular speed over time. This way, the average head direction is taken as an estimate of the user's body direction. Advantage of this embodiment is that no additional sensors are needed for determining the angular rotation of the head.

In a further embodiment, the average direction is determined as an average of the rotation angle over a predetermined period of time. E.g. an average direction can be taken over a sliding time window. This way, the average head orientation, representing the estimated body direction, becomes independent of the body direction far in the past, allowing thus for the estimation to adapt to re-direction of the user's body as e.g. occurs when taking turns during travelling etc.

In a further embodiment, the averaging is adaptive. The averaging can be performed over a predetermined period. It has been observed that for large predetermined periods a good response to small and rapid head movements has been obtained, however it led to a slow adaptation to the head re-direction. This gave a sub-optimal performance for mobile applications (e.g. when taking turns on the bike). Conversely, for small values of the predetermined period the head tracking provided a bad response as it led to unstable sound imaging. It is therefore advantageous to use faster adaptation of the head tracking system to large re-directions than to small re-directions. Hence, the head tracking system adapts slowly to the small head movements that are in turn used for the virtualization experience, and fast to re-direction resulting from driving in the traffic, or significant and prolonged head movements.

In a further embodiment, the processing circuit is further configured to use a direction of a user body torso during the movement of the user as the reference direction. Typically, in a stationary listening environment, the loudspeakers are arranged such that the center of such arrangement (e.g. represented by a physical center loudspeaker) is in front of the user's body. By taking the body torso as the user body representation, virtual sound sources, in binaural reproduction mode, can similarly be placed as if they are arranged in front of the user body. The advantage of this embodiment is that the virtual sound source arrangement depends solely on the user direction and not on the environment. This removes the necessity of having reference points detached from the user. Furthermore, the present embodiment is very convenient for mobile applications where the environment is constantly changing.

In a further embodiment, the direction of the user body torso is determined as the forward body direction of a reference point located on the body torso. For example, the reference point can be chosen at the centre of the sternum or at the solar plexus. The advantage of this embodiment is that the reference point is by choice at a point with a direction, which is stable with regard to the torso orientation, and hence it relieves the need for calibrating the reference direction.

In a further embodiment, the sensing device comprises a magnetic transmitter attached to the reference point and a magnetic sensor attached to the head of the user for receiving a magnetic field transmitted by the magnetic transmitter. By transmitting a magnetic field and measuring received field strength, the orientation of the head can be advantageously measured in a wireless and unobtrusive manner without the need for additional physical or mechanical means.

In a further embodiment, the magnetic transmitter comprises two orthogonal coils placed in a transverse plane, wherein the magnetic field of each of the two orthogonal coils is modulated with different modulation frequencies. Preferably, a first coil is placed in a left-right direction and a second coil in a front-back direction. In such a way two magnetic fields with different orientations are created, which enables the magnetic sensor to discern orientation relative to the two coils e.g. by means of ratios between observed field strengths, instead of responding to absolute field strengths. Thus, the method becomes more robust to absolute field strength variations as could e.g. result from varying the distance to the transmitter.

Having magnetic fields of the two orthogonal coils modulated with different modulation frequencies is especially advantageous for suppressing stationary distortions of the magnetic reference field due to nearby ferromagnetic materials such as posts, chairs, train coach constructions etc., or transmissive materials such as e.g. clothing worn over the magnetic transmitter or the magnetic sensor. The magnetic field can be modulated with a relatively high frequency, preferably in a frequency range of 20-30 kHz, so that fluctuations outside this frequency band, such as slow variations resulting from the aforementioned external influences, are suppressed. Additional advantage of the present embodiment is that by choosing different modulation frequencies for both coils of the magnetic transmitter, and by using selective filtering to these frequencies on the received magnetic field in the magnetic sensor it is possible to sense the head direction in a two dimensions with the magnetic sensor comprising a single coil.

In a further embodiment, the magnetic sensor comprises a coil, wherein the coil is placed in a predetermined direction of the head of the user. This is a convenient orientation of the coil, as it simplifies calculation of the rotation angle.

In a further embodiment, the processing circuit is configured to derive rotation angle of a head of a user from the magnetic field received by the magnetic sensor as the measure.

According to another aspect of the invention there is provided a head tracking method. It should be appreciated that the features, advantages, comments, etc. described above are equally applicable to this aspect of the invention.

The invention further provides an audio reproduction system comprising a head tracking system according to the invention.

These and other aspects, features and advantages of the invention will be apparent from and elucidated with reference to the embodiment(s) described hereinafter.

DETAILED DESCRIPTION OF EMBODIMENTS OF THE PRESENT INVENTION

The present invention relates to head tracking that is suitable for applying to headphone reproduction for creating a realistic out-of-head illusion.

Figure 1:
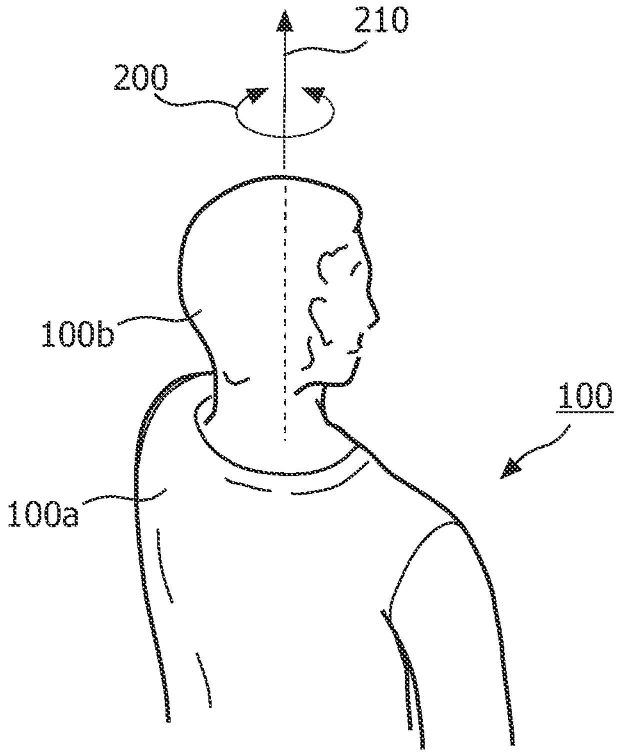
FIG. 1 illustrates a head rotation.

FIG. 1 illustrates a head rotation. A user body 100 is depicted with a body torso 100*a* and a head 100*b*. The axis 210 is the head rotation axis. The rotation itself is depicted by an arrow 200.

Figure 2:
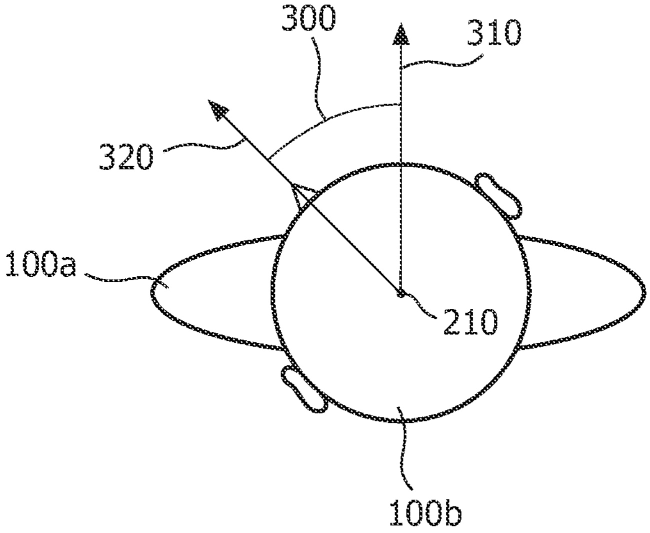
FIG. 2 shows a rotation angle of a head of a user with respect to a reference direction.

FIG. 2 shows a rotation angle 300 of a head 100*b* of a user with respect to a reference direction 310. The view of the user 100 from a top is depicted. A direction 310 is assumed to be the forward direction of the body torso 100*a*, which is also assumed to be a neutral direction of the head 100*b*. The forward body direction is then determined as direction having as reference the user shoulders and facing the direction in which the user face is pointing. This forward body direction is determined whatever the position of the user body is, e.g. whether the user is lying down or half sitting half lying in a relaxation chair. In the remainder of this specification the above definition of the reference direction is used. However, other choices of the reference direction related to body parts of the user could also be used. The direction 310 is the reference direction for determining a rotation angle 300. The reference direction is dependent on a movement of a user 100.

Figure 3:
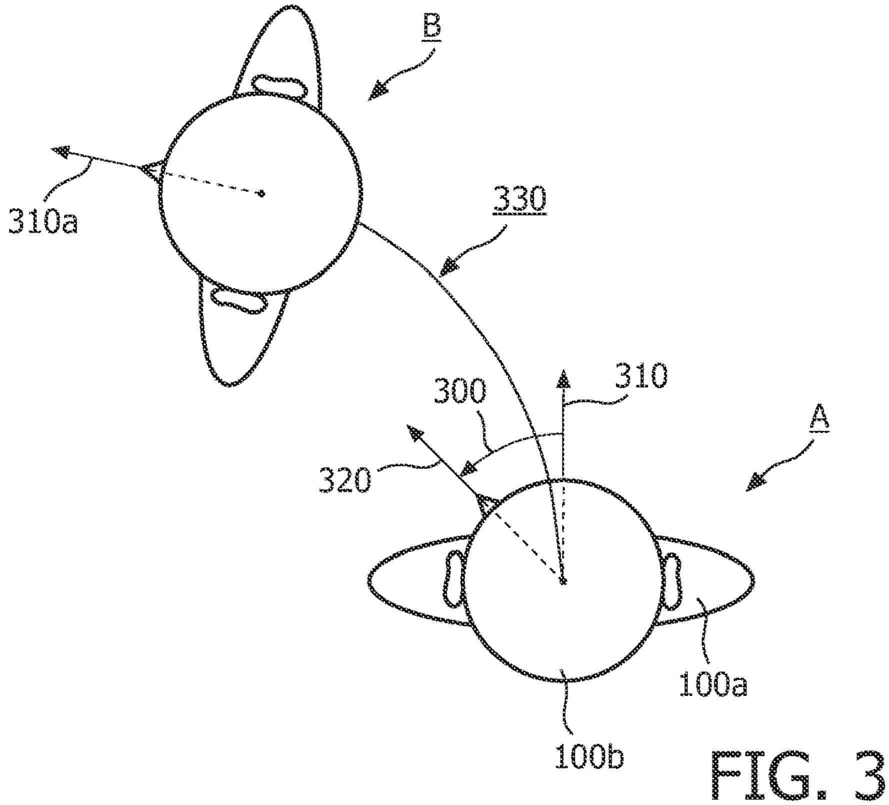
FIG. 3 illustrates a rotation angle of a head of a user with respect to a reference direction, wherein the reference direction is dependent on a movement of a user.

FIG. 3 illustrates a rotation angle 300 of a head 100*b* of a user with respect to a reference direction 310, wherein the reference direction 310 is dependent on a movement 330 of a user. The user body is moving along a trajectory 330 from a position A to a position B. During the user movement his reference direction 310 is changing to a new reference direction 310*a*, that is different from this of 310. The rotation angle in the position A is determined with respect to the reference direction 310. The rotation angle in the position B is determined with respect to the new reference direction 310*a*, which although determined in the same way as the forward direction of the body torso 100*a* is different from the direction 310 in the absolute terms.

Figure 4:
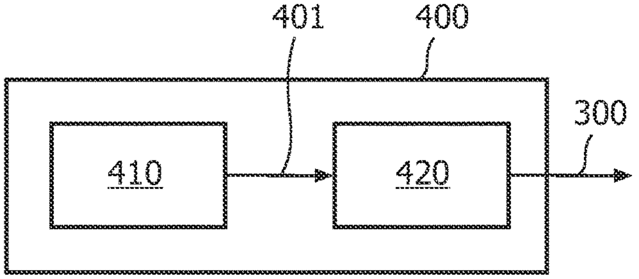
FIG. 4 shows schematically an example of a head tracking system according to the invention, which comprises a sensing device and processing circuit.

FIG. 4 shows schematically an example of a head tracking system 400 according to invention, which comprises a sensing device 410 and a processing circuit 420. The sensing device 410 measures the head movement and provides a measure 401 representing the head movement to the processing circuit 420. The processing circuit 420 derives the rotation angle 300 of the head 100*b* of the user 100 with respect to the reference direction 310 from the measure 401 obtained from the sensing device 410. The reference direction 310 used in the processing circuit 420 is dependent on a movement of a user 100.

The sensing device 410 might be realized using known sensor elements such as e.g. accelerometers, magnetic sensors, or gyroscope sensors. Each of these different types of sensor elements provides a measure 401 of the movement, in particular of the rotation, expressed as different physical quantities. For example, the accelerometer provides an angular speed of rotation, while the magnetic sensor provides strength of magnetic field as the measure of the rotation. Such measures are processed by the processing circuit to result in the head rotation angle 300. It is clear from the schematics of the head tracking system that this system is self contained, and no additional (external, here understood as detached from the user) reference information associated with the environment in which the user is currently present is required. The reference direction 310 required for determining the rotation angle 300 is derived from the measure 401 or is inherent to the sensing device 410 used. This will be explained in more detail in the subsequent embodiments.

In an embodiment, the processing circuit 420 is further configured to determine the reference direction as an average direction of the head of the user during the movement of the user. From point of view of sound source virtualization purpose, when performing small movements around an average direction of the head 100*b*, such as e.g. looking straight forward, the sound sources stay at a fixed position with regard to the environment while the sound source virtualization will move the sound sources in the opposite direction to the movement to compensate for the user's head movement. However, when changing the average direction of the head 100*b*, such as e.g. rotating the head 100*b* by 45 degrees left and maintaining the head in that new direction significantly longer than a predetermined time constant, the virtual sound sources will follow and realign to the new average direction of the head. The mentioned predetermined time constant allows the human perception to 'lock on' to the average sound source orientation, while still letting the head tracking to adapt to longer-term head movements (e.g. looking sideways for more than a few seconds) and/or change the path of travel (e.g. taking a turn while biking).

Figure 5:
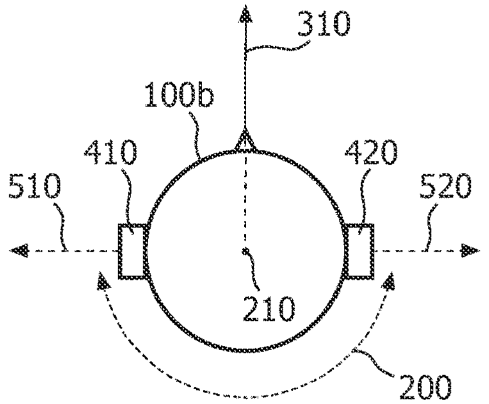
FIG. 5 shows an example of the sensing device comprising at least one accelerometer for deriving an angular speed of the head rotation based on centrifugal force caused by the rotation.

FIG. 5 shows an example of sensing device 410 comprising at least one accelerometer for deriving an angular speed of the head rotation 200 based on centrifugal force caused by the rotation 300. The view of the head 100*b* from a top is depicted. The actual head direction is depicted by 310. The accelerometers are depicted by elements 410*a* and 410*b*. The centrifugal force, derived from an outward pointing acceleration, caused by the rotation is depicted by 510$a$ and 510$b$, respectively.

The explanation of how the angular speed of the head rotation is derived from the centrifugal force caused by the rotation can be found in e.g. Diploma thesis in Media Engineering of Marcel Knuth, Development of a head-tracking solution based on accelerometers for MPEG Surround, Sep. 24, 2007, Philips Applied Technologies University of Applied Sciences Düsseldorf and Philips Research Department of Media. The angular speed of the head rotation is provided as the measure 401 to the processing means 420.

Although the example shown in FIG. 5 depicts two accelerometers, alternatively only one accelerometer could be used, i.e. either the accelerometer 410$a$ or 410$b$.

In a further embodiment, the processing circuit is configured to derive an average direction of the head 100$b$ of the user from the angular speed of the head 100$b$ of the user. The angle 300 of the head rotation is obtained by integrating the angular speed. The magnitude of centrifugal force as available in the sensing device 410 is independent of rotation direction. In order to determine whether the head 100$b$ is rotating left-to-right or right-to-left, the sign of the acceleration signal component in front-rear direction of one or both sensors may be used. In such a case this additional sign information needs to be communicated from the sensing device 410 to the processing circuit 420.

Subsequently applying a high-pass filter to the head rotation angle 300, the variations of the head rotation angle relative to the average rotation, often referred to in this specification as a mean rotation, are obtained. The mean rotation is then considered as the reference direction 310 for determining the rotation angle 300. A typical time constant for the high-pass filter is in the order of a few seconds.

Alternatively the variations of the head rotation angle 300 relative to the mean rotation can be obtained using low-pass filtering. In such a case, first the average direction, i.e. the reference direction 310, is computed using a low-pass filtering LPF( ) applied to the actual rotation angle $O(t)_{actual}$, and then a difference of actual and average direction is computed to determine the relative direction associated with a rotation angle 300:

$$O(t)_{relative}=O(t)_{actual}-O(t)_{mean}, \text{ where}$$

$$O(t)_{mean}=\mathrm{LPF}(O(t)_{actual})$$

When using linear low-pass filters, this two-step approach is equivalent to high-pass filtering. Using the low-pass filtering, however, has the advantage that it allows for non-linear determination, such as using adaptive filtering or hysteresis, of the average direction in the first step.

In a further embodiment, the average direction, hence the reference direction 310, is determined as an average of the rotation angle 300 over a predetermined period of time. The average direction is then determined by taking the average of the direction over the past T seconds according to a following expression:

$$O(t)_{mean} = \frac{1}{T}\int_{\tau=t-T}^{t} O(\tau)\,d\tau$$

It should be noted that the averaging presented above can be looked upon as a rectangular FIR low-pass filter. Various values can be used for T, but preferably in the range of 1 to 10 seconds. Large values of T give a good response to small and rapid movements, but they also lead to a slow adaptation to re-directions. This works sub-optimally in mobile situations (e.g. during turning while biking). Conversely, small values of T in combination with the headphone reproduction lead to unstable imaging even at small head rotations.

In a further embodiment, the averaging is adaptive. It is advantageous to adapt to larger re-directions, i.e. large rotation angles, faster than for small re-directions. This adaptiveness is realized by making the averaging time $T_a$ adaptive. This can be done according to the following:

$$O(t)_{mean} = \frac{1}{T_a}\int_{\tau=t-T_a}^{t} O(\tau), \quad \text{where}$$

$$T_a = T_{max} + R\cdot(T_{min} - T_{max}) \text{ and}$$

$$R = \min\left(\frac{|O(t) - O(t)_{mean}|}{O_{max}}, 1\right)$$

A relative direction ratio R takes its values from the range [0, 1]. The relative direction ratio R takes on a maximum value of 1 if the relative direction equals or exceeds a given rotation angle $O_{max}$. In this case, the averaging time $T_a$ takes on a value $T_{min}$. This results in a fast adaptation for large instantaneous relative re-directions. Conversely, the slow adaptation with time constant $T_{max}$ occurs at small instantaneous relative re-directions. Example settings for adaptation parameters $T_{min}$, $T_{max}$, and $O_{max}$ are $T_{min}$=3 s, $T_{max}$=10 s, $O_{max}$=60°.

These parameter values work well in terms of adaptation speed behavior, also for (imaginary) travelling in a car or by bike. Unfortunately, the adaptive averaging described above might become unstable in case the head direction is varying significantly in the further past and only marginally in the recent past. In such case the averaging time constant oscillates between minimum and maximum values $T_{min}$ and $T_{max}$. To overcome the stability issue, an FIR filter might be substituted by an adaptive IIR lowpass filter, which leads to the following adaptation:

$$O(kT)_{mean} = \alpha\cdot O(kT) + (1-\alpha)\cdot O((k-1)T)_{mean} \text{ where}$$

$$\alpha = \sin\left(2\pi\cdot\frac{f_c}{f_s}\right),$$

$$f_c = f_{c,min} + R\cdot(f_{c,max} - f_{c,min}) \text{ and}$$

$$R = \min\left(\frac{|O(t) - O(t)_{mean}|}{O_{max}}, 1\right)$$

Here, the cutoff frequency $f_c$ (rather than the time constant, as in the averaging filters) is linearly interpolated between minimum and maximum values $f_{c,min}$ and $f_{c,max}$, in accordance with the relative direction ratio R.

Example settings for adaptation parameters $f_{c,min}$, $f_{c,max}$ and $O_{max}$ are $f_{c,min}$=1/30 Hz, $f_{c,max}$=1/8 Hz, $O_{max}$=90 degrees.

Although the above parameters take on fixed values, it is also possible to allow these parameter values to vary over time in order to be better tailored to real-life situations such as travelling by car/train/bike, walking, sitting at home etc.

In a further embodiment, the processing circuit 420 is further configured to use a direction of a user body torso 100*a* during the movement of the user 100 as the reference direction 310. For mobile applications, absolute head orientation is considered to be less relevant, since the user is displacing anyway. It is therefore advantageous to take the forward pointing direction of the body torso as the reference direction.

In a further embodiment, the direction of the user body torso 100*a* is determined as the forward body direction of a reference point located on the body torso. Such reference point preferably should be representative for the body torso direction as a whole. This could be e.g. a sternum or solar plexus position, which exhibits little or no sideways or up-down fluctuations when the user 100 moves. Providing the reference direction itself can be realized by using e.g. an explicit reference device that is to be worn at a know location on the body torso 100*a*, which is relatively stable. For example it could be a clip-on device on a belt.

Figure 6:
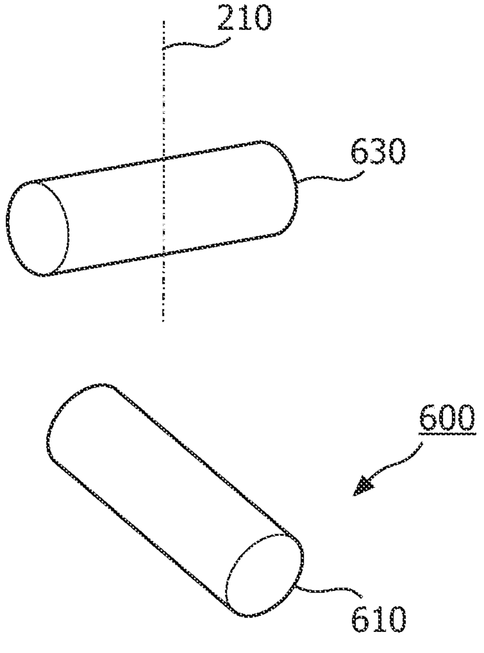
FIG. 6 shows an example of the sensing device comprising a magnetic transmitter and a magnetic sensor for receiving a magnetic field transmitted by the magnetic transmitter, wherein the magnetic transmitter comprises a single coil.

FIG. 6 shows an example of the sensing device 410 comprising a magnetic transmitter 600 and a magnetic sensor 630 for receiving a magnetic field transmitted by the magnetic transmitter 600, wherein the magnetic transmitter comprises a single coil 610. The reference direction is provided by the magnetic transmitter 610, which is located at the reference point on the body torso 100*a*. The magnetic sensor 630 is attached to the head 100*b*. Depending on the rotation of the head 100*b*, the magnetic field received by the magnetic sensor 630 varies accordingly. The magnetic field received by the magnetic sensor 630 is the measure 401 that is provided to the processing circuit 420, where the rotation angle 300 is derived from the measure 401.

From the field strength the rotation angle 300 can be determined as follows. At axis 210, at a distance which is relatively large compared to the transmitter coil, the magnetic field lines of the transmitted field are approximately uniformly distributed, and are running parallel to the transmitter coil's orientation. When the receiver coil comprised in the magnetic sensor 630 is arranged in parallel to the transmitter coil at a given distance, the received field strength equals a net value $B_0$. When rotating the receiver coil over an angle $\alpha$, the received field strength $B(\alpha)$ becomes:

$$B(\alpha)=B_0 \sin(\alpha)$$

And the angle of head rotation can be derived from the received field strength as:

$$\alpha=\arcsin(B(\alpha)/B_0)$$

Note that the arcsin function maps the field strength onto an angle [−90°, 90°]. But by nature, the head rotation angle is also limited to a range of 180° (far left to far right). By arranging the transmitter coil left-to-right or vice versa, the head rotation can be unambiguously tracked over the full 180° range.

Figure 7:
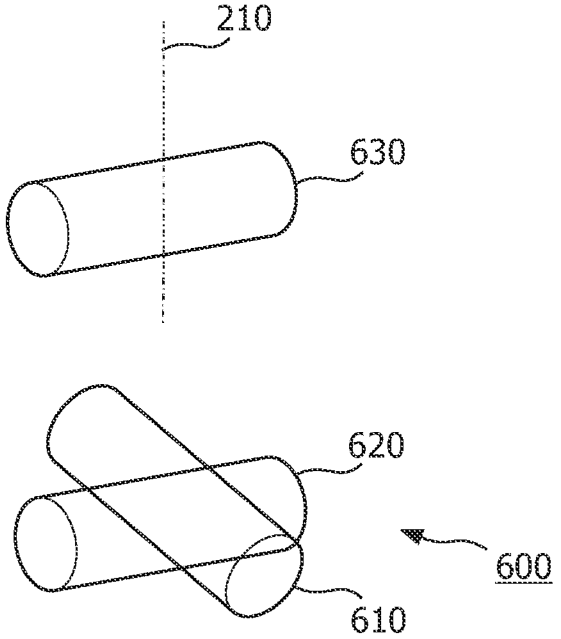
FIG. 7 shows an example of the sensing device comprising the magnetic transmitter and the magnetic sensor for receiving a magnetic field transmitted by the magnetic transmitter, wherein the magnetic transmitter comprises two coils.

FIG. 7 shows an example of the sensing device comprising the magnetic transmitter 600 and the magnetic sensor 630 for receiving a magnetic field transmitted by the magnetic transmitter 600, wherein the magnetic transmitter comprises two coils 610 and 620. These two coils 610 and 620 are arranged orthogonally, wherein a first coil 610 is placed in a left-right direction and a second coil 620 in a front-back direction. The magnetic field created by each of the two orthogonal coils is modulated with different modulation frequencies. This combined with a selective filtering to these frequencies (typically e.g. at 20 to 40 kHz) in the magnetic sensor allows sensing the orientation in two directions with just a single coil in the magnetic sensor, as follows. The received field is composed of the sum of two components, one from each of the two transmitter coils 610 and 620:

$$B(\alpha,t)=B_{0,610}(t)\cdot\sin(\alpha)+B_{0,620}(t)\cdot\cos(\alpha)$$

By filtering, the two components can be separated and a ratio R of their peak values can be determined:

$$R=B_{0,610,peak}\sin(\alpha)/B_{0,620,peak}\cos(\alpha)$$

By ensuring that both transmitted magnetic field components have same strength at the transmitter, and thus the same peak strength at the receiver ($B_{0,610,peak}=B_{0,620,peak}$), this can be simplified to:

$$R=\sin(\alpha)/\cos(\alpha)=\tan(\alpha)$$

and the angle of the head rotation can be derived from the ratio R of the received field peak strengths as:

$$\alpha=\arctan(R)$$

It should be noted that in this embodiment the angle of the head rotation is independent of absolute field strength e.g. resulting from varying distance between transmitter and receiver coils, compared to the aforementioned single-transmitter coil embodiment which does depend on absolute field strength.

It should be clear that the measure 401 comprises the magnetic field received from the coils 610 and 620. Alternatively, when both these fields have the same transmission strength the ratio R could be provided to the processing circuit 420. The derivation of the rotation angle from either the magnetic fields received by the magnetic sensor 630 or the ratio R is performed in the processing circuit 420.

Alternatively to the magnetic transmitter and the magnetic sensor, 3D accelerometers could be used, wherein one 3D accelerometer is placed at the reference point and a second accelerometer is attached to the user head. The difference of the measurements of the two accelerometers can then be used to compute the rotation angle.

Figure 8:
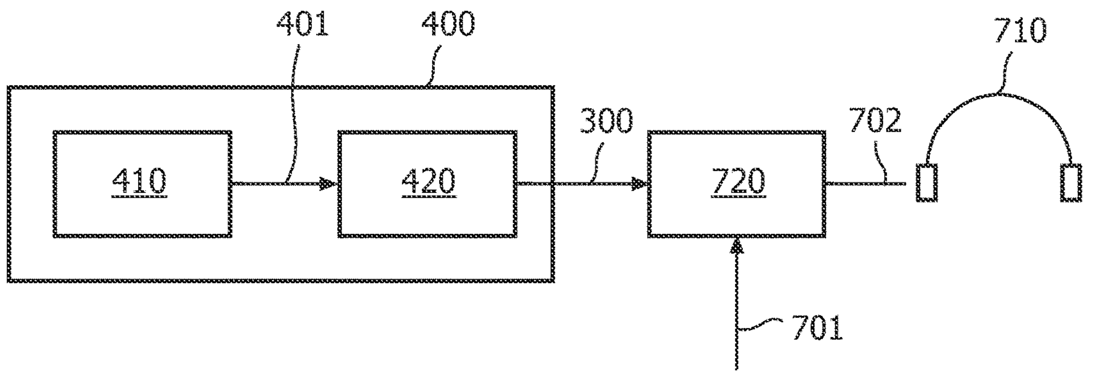
FIG. 8 shows an example architecture of an audio reproduction system comprising the head tracking system according to the invention.

FIG. 8 shows an example architecture of an audio reproduction system 700 comprising the head tracking system 400 according to the invention. The head rotation angle 300 is obtained in the head tracking system 400 and provided to the rendering processor 720. The rendering processor 720 also receives audio 701 to be reproduced on headphone 710.

The audio reproduction system 700 realizes audio scene reproduction over headphone 710 providing a realistic out-of-head illusion. The rendering processor 720 renders the audio such that the audio scene associated with the audio 701 is rotated by an angle opposite to the rotation angle of the head. The audio scene should be understood as a virtual location of sound sources comprised in the audio 701. Without any further processing, the audio scene reproduced on the headphone 710 moves along with the movement of the head 100*b*, as it is associated with the headphone that moves along with the head 100*b*. To make the audio scene reproduction more realistic the audio sources should remain in unchanged virtual locations when the head together with the headphone rotates. This effect is achieved by rotating the audio scene by an angle opposite to the rotation angle of the head 100*b*, which is performed by the rendering processor 720.

The rotation angle is according to the invention determined with respect to the reference direction, wherein the reference direction is dependent on a movement of a user. This means that in the case the reference direction is an average direction of the head of the user during the movement of the user the audio scene is centrally rendered about this reference direction. In case when the reference direction is a direction of a user body torso during the movement of the user, the audio scene is centrally rendered about this reference direction, hence it is fixed to the torso position.

Conventional binaural rendering of multi-channel audio signal is conducted by convolution of a multi-channel audio signal by the HRTF impulse responses:

$$l[n] = \sum_{\forall\varphi} \sum_{k=0}^{K-1} x_\varphi[n-k] \cdot h_{L,\varphi}[k],$$

$$r[n] = \sum_{\forall\varphi} \sum_{k=0}^{K-1} x_\varphi[n-k] \cdot h_{R,\varphi}[k],$$

where $h_{L,\varphi}[k]$ and $h_{R,\varphi}[k]$ represent the left and right HRTF impulse responses respectively for angle φ, $x_\varphi[n]$ represents the multi-channel audio signal component corresponding to the angle φ and where K represents the length of the impulse responses. The binaural output signal is described by the left and right signals l[n] and r[n] respectively. For a typical multi-channel set-up the set of angles φ consist of $\varphi \epsilon [-30, 0, 30, -110, 110]$ using a clockwise angular representation for the left front, center, right front, left surround and right virtual surround speakers, respectively.

In case of using headtracking an additional time-varying offset angle can be applied as:

$$l[n] = \sum_{\forall\varphi} \sum_{k=0}^{K-1} x_\varphi[n-k] \cdot h_L[k, \varphi - \delta[n]],$$

$$r[n] = \sum_{\forall\varphi} \sum_{k=0}^{K-1} x_\varphi[n-k] \cdot h_R[k, \varphi - \delta[n]],$$

where δ[n] is the (headtracking) offset angle which corresponds to the rotation angle $O(t)_{relative}$, as determined by the head tracking system according to the invention using a clockwise angular representation. The angle opposite to the rotation angle is here realized by the "–" sign preceding the rotation angle δ[n]. Hence, the modified audio 702 comprising the modified sound source scene is provided to the headphone 710.

Figure 9:
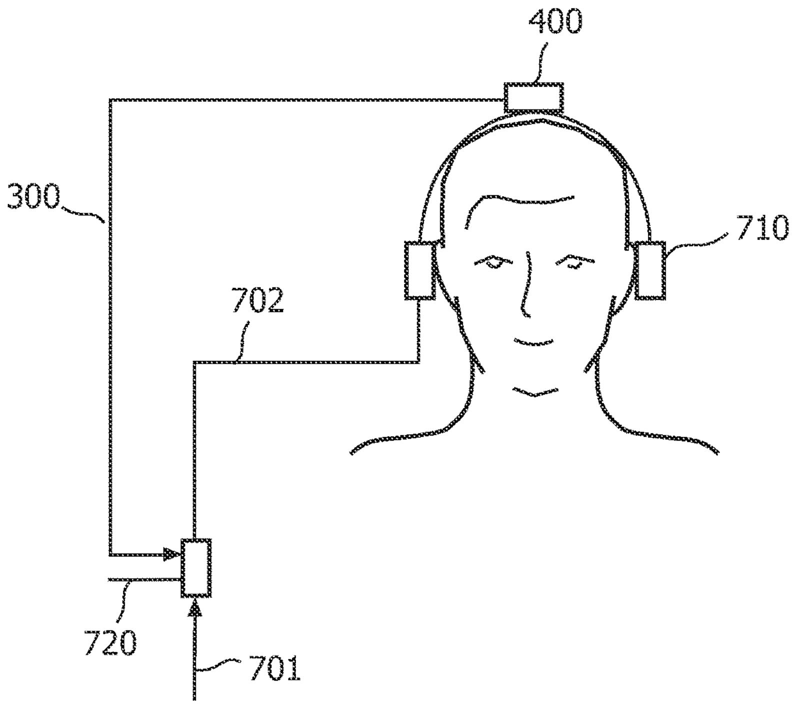
FIG. 9 shows a practical realization of the example architecture of the audio reproduction system comprising the head tracking system according to the invention.

FIG. 9 shows a practical realization of the example architecture of the audio reproduction system 700 comprising the head tracking system 400 according to the invention. The head tracking system is attached to the headphone 710. The rotation angle 300 obtained by the head tracking system 400 is communicated to the rendering processor 720, which rotates the audio scene depending on the rotation angle 300. The modified audio scene 702 is provided to the headphone 710.

It is preferred that the head tracking system is at least partially integrated with the headphone. For example, the accelerometer could be integrated into one of the ear cups of the headphone. The magnetic sensor could also be integrated into the headphone itself, either in one of the ear cups or in the bridge coupling the ear cups.

The rendering processor might be integrated into a portable audio playing device that the user takes along when on the move, or into the wireless headphone itself.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term "comprising" does not exclude the presence of other elements or steps.

Furthermore, although individually listed, a plurality of circuit, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. In addition, singular references do not exclude a plurality. Thus references to "a", "an", "first", "second" etc. do not preclude a plurality. Reference signs in the claims are provided merely as a clarifying example and shall not be construed as limiting the scope of the claims in any way. The invention can be implemented by circuit of hardware comprising several distinct elements, and by circuit of a suitably programmed computer or other programmable device.

The invention claimed is:

1. A head tracking system comprising:

a sensing device configured to sense changes in a direction of a head of a user resulting in a value representing the sensed changes in the direction of the head; and a processing circuit configured to determine a reference direction of the head independent of an environment of the user by adaptively averaging the direction of the head during movement of the user, wherein the reference direction of the head is adapted to larger changes in the direction of the head faster than to relatively smaller changes in the direction of the head, derive a rotation angle of the head with respect to the reference direction from the value, receive audio including an audio scene from an audio source, adapt the received audio scene based on the derived rotation angle of the head, and render an audio signal based on the received audio and the adapted audio scene.

2. The head tracking system as claimed in claim 1, wherein the averaging of the direction of the head of the user is taken over a sliding time window.

3. The head tracking system as claimed in claim 1, wherein the sensing device comprises at least one accelerometer for deriving an angular speed of a rotation of the head of the user based on centrifugal force caused by the rotation.

4. The head tracking system as claimed in claim 3, wherein the processing circuit is configured to derive an average direction of the head of the user from the angular speed of the head of the user.

5. The head tracking system as claimed in claim 4, wherein the average direction of the head is determined as an average of the rotation angle over an adaptive period of time Ta, wherein the larger changes in the direction of the head result in the adaptive period of time Ta being shorter than the relatively smaller changes in the direction of the head.

6. The head tracking system as claimed in claim 1, wherein a direction of a body of the user during the movement of the user is used as the reference direction.

7. The head tracking system as claimed in claim 6, wherein the movement of the user is determined as movement of a reference point located on the body of the user.

8. The head tracking system as claimed in claim 7, wherein the sensing device comprises a magnetic transmitter attached to the reference point and a magnetic sensor attached to the head of the user for receiving a magnetic field transmitted by the magnetic transmitter.

9. The head tracking system as claimed in claim 8, wherein the magnetic transmitter comprises two orthogonal coils placed in a transverse plane, wherein the magnetic field created by each of the two orthogonal coils is modulated with different modulation frequencies.

10. The head tracking system as claimed in claim 8, wherein the magnetic sensor comprises a coil, wherein the coil is placed in a predetermined direction of the head of the user.

11. The head tracking system as claimed in claim 8, wherein the processing circuit is configured to derive rotation angle of the head of the user from the magnetic field received by the magnetic sensor.

12. A head tracking method comprising acts of:
- sensing changes in a direction of a head of a user resulting in a value representing the sensed changes in the direction of the head;
- determining a reference direction of the head independent of an environment of the user by adaptively averaging the direction of the head during movement of the user, wherein the reference direction of the head is adapted to larger changes in the direction of the head faster than to relatively smaller changes in the direction of the head;
- deriving a rotation angle of the head of the user with respect to the reference direction from the value;
- receiving audio including an audio scene;
- adapting the received audio scene based on the derived rotation angle of the head; and
- rendering an audio signal based on the received audio and the adapted audio scene.

13. An audio reproduction system for audio scene reproduction over headphone comprising:
- a headphone for reproducing an audio scene;
- a rendering processor for rendering the audio scene to be reproduced;
- a head tracking system including
  - a sensor configured to sense changes in a direction of a head of a user resulting in a value representing the sensed changes in the direction of the head, and
  - a processor for determining a reference direction of the head independent of an environment of the user by adaptively averaging the direction of the head during movement of the user, wherein the reference direction of the head is adapted to larger changes in the direction of the head faster than to relatively smaller changes in the direction of the head, and for determining a rotation angle of the head of the user with respect to the reference direction from the value,
- wherein the rendering processor is configured to:
  - receive audio including an audio scene from an audio source,
  - adapt the received audio scene based on the derived rotation angle of the head, and
  - provide an audio signal based on the received audio and the adapted audio scene to the headphone for reproduction.

14. The audio reproduction system as claimed in claim 13, wherein head tracking system is at least partially integrated with the headphone.

15. The head tracking system as claimed in claim 1, wherein the adaptive averaging adapts the reference direction slower to small movements of the head of the user than to larger movements of the head of the user.

16. The head tracking system as claimed in claim 1, wherein the adaptive averaging adapts the reference direction faster to large changes in the rotational angle of the head of the user than to smaller changes in the rotational angle of the head of the user.

* * * * *